United States Patent [19]

Kutauskas

[11] Patent Number: 5,176,013
[45] Date of Patent: Jan. 5, 1993

[54] ANTI-BOOTING AND ANTI-TOWING DEVICE FOR A MOTOR VEHICLE

[76] Inventor: Edmund A. Kutauskas, 1320 News Ave., Elmont, N.Y. 11003

[21] Appl. No.: 888,006

[22] Filed: May 26, 1992

[51] Int. Cl.$^5$ ............................................. B62H 5/16
[52] U.S. Cl. ............................................ 70/18; 70/19; 70/226; 188/32
[58] Field of Search .................... 70/18, 19, 209, 211, 70/212, 225, 226, 228, 237, 238, 259, 260; 188/32

[56] References Cited

U.S. PATENT DOCUMENTS

| | | | |
|---|---|---|---|
| 1,098,103 | 5/1914 | Freschl | 70/19 |
| 1,409,106 | 3/1922 | Hess | 70/19 |
| 1,607,778 | 11/1926 | Noreau | 70/260 |
| 1,616,155 | 2/1927 | Uebelmesser | 70/260 |
| 4,649,724 | 3/1987 | Raine | 70/226 |
| 4,699,238 | 10/1987 | Tamir | 70/238 X |
| 4,833,442 | 5/1989 | Von Heck | 70/226 X |
| 5,007,259 | 4/1991 | Mellard | 70/226 X |

FOREIGN PATENT DOCUMENTS

| | | | |
|---|---|---|---|
| 0343814 | 11/1989 | European Pat. Off. | 70/226 |
| 2520683 | 8/1983 | France | 70/226 |
| 2091656 | 8/1982 | United Kingdom | 70/237 |

Primary Examiner—Lloyd A. Gall
Attorney, Agent, or Firm—Nicholas J. Garofalo

[57] ABSTRACT

A device having a pair of right-angle members slidable relative to each other to bring the jaws mounted to the foot of a leg of one of the members and the jaws of an opposed clamp mounted to the foot of a parallel leg of the other member into clamped engagement with diametrically opposed brake cooling slots and the adjacent surface of a wheel of a parked motor vehicle, and including a key operable lock mounted in part to each of the right-angle members which serves to secure the members in the clamped condition. In its diametrically applied condition to the wheel, the device obstructs application of a boot over the lug nuts of the wheel, and an elongated arm of one of the member extends beyond the periphery of the wheel so as to immobolize the wheel against rotation relative to the roadway.

8 Claims, 1 Drawing Sheet

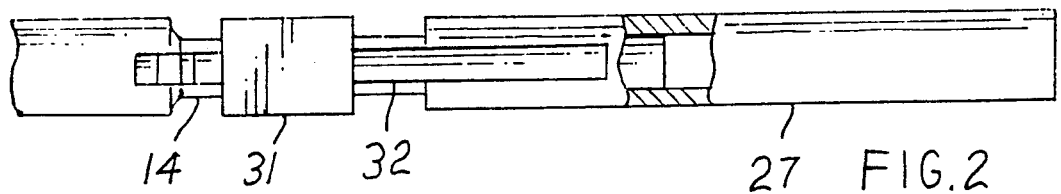
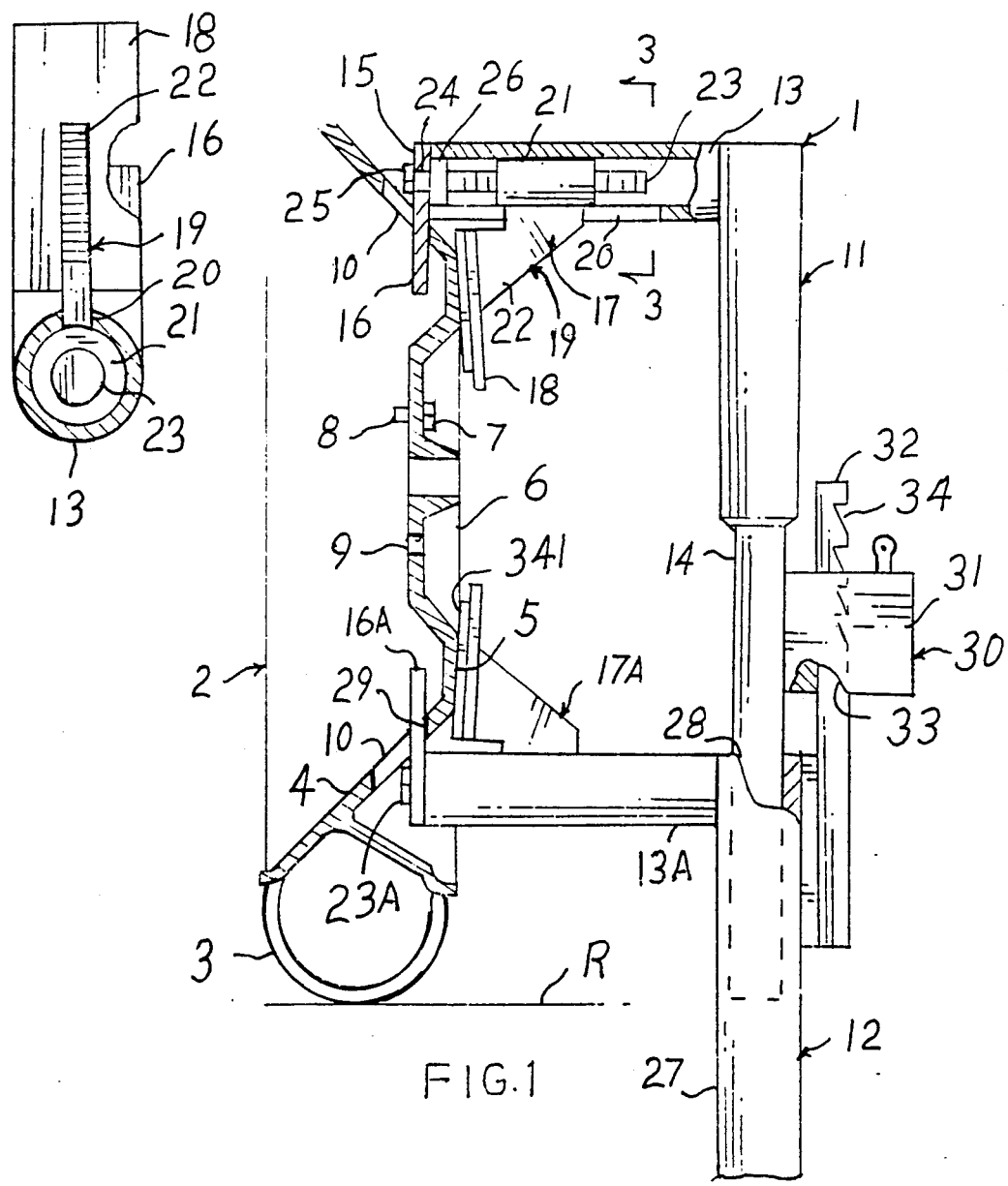

ANTI-BOOTING AND ANTI-TOWING DEVICE FOR A MOTOR VEHICLE

BACKGROUND OF THE INVENTION

This invention relates to means for preventing unwarranted interference with a wheel of a parked motor vehicle as well as preventing unwarranted movement of the vehicle. More particularly, it is directed to a device which can be easily mounted and locked upon a wheel of a parked motor vehicle by its driver. The device when so mounted prevents application by others of a boot to the wheel as well as rotation of the wheel and, accordingly, prevents unauthorized movement or towing of the vehicle.

It is a common occurrence today for an individual to park his vehicle, and to return some time later to find a wheel has been interfered with or that the vehicle is gone. It may have been towed away or a boot may have been applied to it by public servants for violation of a parking regulation; or it may have been stolen by vandals.

The conventional boot is an appliance customarily locked onto a wheel of a motor vehicle by public servants because of its being in violation of a parking regulation. The appliance engages over the wheel's tire and covers its lug nuts, so that the owner cannot upon returning to his vehicle replace the wheel with a spare and drive the vehicle away. To later redeem his vehicle, the owner is usually required to pay a substantial and objectionable penalty.

A general object of this invention is to provide a device, that is mountable to a wheel of a motor vehicle by its driver at the time of his parking the vehicle, as a guard against such occurrences, and which will reasonably assure him that he will not only find his vehicle where parked upon his return to it but will also find it with its wheels undisturbed so that he may drive it away.

A further object of this invention is to provide a device which can be locked onto a wheel of a motor vehicle being parked by its driver and will prevent the subsequent application by others of a boot to the wheel.

Another object of the invention is to provide a device which can be locked onto a wheel of a motor vehicle being parked by its driver, and which device has a radially extending arm that is subject to abutment with the roadway so as to prevent rotation of the wheel and movement of the vehicle.

A desirable feature of the device embodying the invention lies in its simple and uncomplicated structure, whereby it may quickly and without difficulty be applied to a wheel of a motor vehicle by male or female. Further, it is not cumbersome and, when not in use, may be stored in the trunk of a vehicle.

The foregoing and other objects, features and advantages of the invention will appear more fully hereinafter from a consideration of the accompanying description which follows, taken together with the accompanying drawing wherein an embodiment of the invention is illustrated. It is to be expressly understood, however, that the drawing is for purposes of illustration and description, and it is not to be construed as defining the limits of the invention.

BRIEF SUMMARY OF THE INVENTION

The invention provides a device which can be easily applied and locked onto a wheel of a motor vehicle and, when so applied, will prevent rotation of the wheel relative to the roadway or application by others of a boot to the wheel. The device comprises a pair of right-angle sections that are slidably engaged to each other. The sections may be slidably adjusted relative to each other so as to bring jaws of a clamp mounted to a bottom end of a leg of one of its sections, and the jaws of a similar clamp mounted to a bottom end of a parallel leg of its other section into a wedged clamped engagement with upper edges of opposed brake cooling slots and the crest of a convexed part of a wheel of a motor vehicle. And the device is provided with a key operable lock for securing the sections in their adjusted condition and thereby securing the engaged condition of the clamps to the wheel. The sections and clamps are adjustable to enable application of the device to the brake cooling slots and crests of wheels of various diameters.

BRIEF DESCRIPTION OF THE DRAWING

In the accompanying drawing:

FIG. 1 is a side elevational view of a device embodying the invention illustrated as applied to a wheel of a motor vehicle;

FIG. 2 is a top plan view of the slidably connected arms of the device apart from the wheel of the motor vehicle; and FIG. 3 is an enlarged cross-section of a leg of the device taken on line 3—3 of FIG. 1.

DETAILED DESCRIPTION OF THE INVENTION

Reference is now directed to the accompanying drawing wherein a device 1 embodying the invention is shown as applied to a conventional wheel 2 of a motor vehicle. The wheel has inwardly of its tired periphery 3 a convexed surface 4 which rises up to a crest 5 forming the periphery of a central plane surface 6. A conventional ring of lug nuts 7 on lug bolts 8 projecting through holes 9 in the central plane surface secure the wheel to the vehicle; and a ring of brake cooling slots 10 open laterally through the convexed surface 4 below the crest 5 of the wheel.

The device 1, illustrating an embodiment of the invention, comprises a pair of metal sections 11, 12, which are right-angled in form and slidably engaged to each other.

Section 11 has a leg 13 forming one of its sides, which leg extends at right angles from an end of an elongated arm 14 forming its other side. The elongated arm is preferably solid. Leg 13, which is tubular, has fixed over its bottom a tab 15. An extension of the tab at right angles away from the leg serves as the lower jaw 16 of a clamp 17. The clamp includes an upper jaw 18 in the form of a rectangular plate which is a part of a bracket 19. The bracket is slidable relative to the leg along an elongated linear slot 20 in the rear wall area of the leg to adjust the clamping relation of the upper jaw relative to the lower jaw. The bracket includes a cylindrical slide nut 21 located within the tubular leg 13. A flat surfaced flange or rib 22 fixed along its rear to the slide nut projects through slot 20 and is fixed along its outer end to the back surface of the upper jaw. The slide nut is threaded to an elongated bolt 23 which extends axially into the leg through a hole 24 in the tab 15. A head 25 of the bolt bears against the outer surface of the tab; and a collar 26 fixed to the bolt bears against the inner surface of the tab, whereby the bolt is rotatable but restrained against axial movement.

Upon application of a wrench to the head of the bolt 23, rotation of the bolt will be translated into axial movement of the slide nut in the leg and movement of the bracket along the slot 20 to carry the upper jaw 18 toward or away from the lower jaw 16, accordingly as the bolt is rotated in one direction or the other as may be needed to obtain a desired adjusted clamping condition of the jaws of the clamp with the wheel to which the device is to be applied. And the upper jaw is preferably fixed to the rib 22 of the bracket 19 at a small upwardly inclined angle, which may be about 15 degrees. This inclination of the upper jaw relative to the lower jaw enables the jaws of the clamp to obtain a wedged condition of the clamp with a wheel.

The other right-angle section 12 of the device 1 includes as one of its sides a tubular leg 13A, which is similar to leg 13; and the leg 13A has a clamp 17A mounted to it corresponding to clamp 17. Leg 13A extends at right-angles from an end of an elongated tubular arm 27 that forms the other side of right-angle section 12. The tubular arm is open at its inner end 28; and the elongated solid arm 14 of the right-angle section 11 is slidably and snugly received through this open end into the tubular arm 27.

In the assembled condition of the right-angle sections 11, 12 to each other, as appears in FIG. 1, the slidably engaged arms 14, 27 of the sections define a linearly extending unit; the legs 13, 13A of the sections are of the same length and parallel to each other; and the jaws of the clamps 17, 17A extend toward each other.

Prior to applying the device 1 to a wheel of a motor vehicle, the elongated bolts 23, 23A of the respective legs 13, 13A are rotated by means of a wrench applied to the heads 25 of the bolts to obtain a proper spacing of the upper jaws of the clamps 17, 17A relative to the lower jaws, so as to enable entry of the lower jaws into opposed brake cooling slots 10, and abutment of the upper jaws with the crest 5 of the wheel.

Following adjustment of the spacing of the jaws of the clamps, the device is positioned with its lower jaws 16, 16A in alignment with a pair of diametrically opposed brake cooling slots. The elongated arms 14, 27 of the device are then manually slid toward each other to enter the lower jaws into the brake cooling slots and to abut the upper jaws with the crest area 5 of the wheel. The arms 14, 27 of the device are then manually pressured toward each other. This forces the vertex areas of the clamps, defined by the upward inclination of the upper jaws relative to the lower jaws, to obtain a tightly wedged engagement of the clamps to the wheel with the lower jaws abutting the upper edges 29 of the brake cooling slots and the upper jaws abutting the crest area 5 of the wheel.

A key operable lock 30 is then operated to lock the device in its clamped condition to the wheel. The lock includes a housing 31 fixed to the elongated arm 14, and an elongated notched shackle rod 32 fixed to the elongated arm 27. The shackle rod is aligned with and slidable through a hole 33 in the housing of the lock as the arms 14, 27 of the device are moved toward each other in engaging the clamps to the wheel. Upon the clamped condition being reached, the lock is then key operated to cause in conventional manner a latch, not shown, in the housing of the lock to engage in one of the notches 34 of the shackle rod and thereby restrain the device 1 in its tightly clamped condition to the wheel. A rubber pad 341 may be affixed to the underface of each of the upper jaws. It serves to avoid scraping damage of the upper jaws with the crest area of the wheel.

The elongated arm 27 of the device is sufficiently elongated to extend radially and substantially beyond the periphery of the wheel to which the device is applied; and, should rotation of the wheel of a parked vehicle be attempted, the extended arm will engage and limit against the roadway R so as to immobilize and prevent forward movement of the wheel and vehicle. Attempted towing of the vehicle would thereby be prevented.

In a clamped condition of the device 1 to a wheel of a motor vehicle, as appears in FIG. 1, the legs 13, 13A of the device project several inches from the surface of the wheel, preferably about six inches. This projection of the device, together with its elongated arms 14, 27 that bridge the legs in parallel alignment with the diameter of the wheel, prevents and blocks application of the conventional boot to and over the central lug nut area of the wheel.

While an embodiment of the invention has been illustrated and described in detail, it is to be expressly understood that the invention is not limited thereto, and it is my intent, therefore, to claim the invention not only as shown and described but also in all such forms and modifications thereof as may be reasonably construed to fall within the spirit of the invention and the scope of the appended claims.

What is claimed is:

1. A device adapted to be mounted to the surface of a wheel of a parked motor vehicle and when mounted serving to immobilize the wheel against rotation, the device comprising: a rod slidable inwardly and outwardly of an elongated tube, a leg depending at right-angles from an outer part of the rod, and a parallel similar leg depending at right-angles from a part of the elongated tube; a clamp at the bottom of one leg having a lower jaw receivable in a brake cooling slot of the wheel and having an upper jaw engageable with an upper surface of the wheel bordering the brake cooling slot, and a similar clamp at the bottom of the other leg similarly engageable with a diametrically opposed brake cooling slot and upper surface of the wheel upon sliding the rod inwardly of the elongated tube; key operable means mounted to the device for locking the rod in its inwardly moved position with the elongated tube; and the elongated tube being sufficiently lengthy as to extend beyond the periphery of the wheel for engagement with the roadway upon which the vehicle may be parked.

2. A device as in claim 1, wherein the rod and the elongated tube in a clamped condition of the device with diametrically opposed brake cooling slots obtains a condition raised by the legs above and in parallel alignment with the diameter of the wheel, whereby application of a boot over the central area of the wheel is obstructed.

3. A device as in claim 2, wherein the diametrically opposed brake cooling slots are in a convexed portion of the wheel, which portion rises to a crest, the lower jaw of each clamp is adapted for entry into the related brake cooling slot, and means is provided for spacing the upper jaw above the lower jaw sufficiently to engage the upper jaw with the crest.

4. A clamping device comprising an elongated rod slidably received in an elongated tube through an open end of the tube, a leg depending at right-angles from an outer end of the rod, a similar leg depending at right-angles from the open end of the tube in parallel relation to the other leg, a separate clamp mounted to the bottom end of each leg, each clamp comprising an upper jaw and a lower jaw, the jaws of each leg extending toward the jaws of the other leg, the rod adapted to be manually moved selectively inwardly or outwardly relative to the tube to space the jaws of the related leg a selected distance relative to the jaws of the other leg; and key operable locking means mounted in part to the rod and in part to the tube for locking the rod in its moved position with the tube, wherein each leg is tubular and has a vertically extending slot in its wall, the lower jaw of each clamp is fixed at a rear area thereof over the bottom end of the related leg, a bolt extends axially through the rear area of the lower jaw up into the leg, means is mounted to the bolt restraining it against axial movement relative to the leg but allowing rotatable movement of the bolt, a slide nut is threaded upon the bolt and movable along the bolt relative to the leg accordingly as the bolt is rotated in one direction or the other, a flange extending through the vertically extending slot is fixed at an inner end to the nut and at an outer end to the upper jaw of the related clamp, and the flange is adapted for movement along the vertically extending slot with the nut to space the upper jaw relative to the lower jaw accordingly as the nut is directionally moved.

5. A clamping device comprising an elongated rod slidably received in an elongated tube through an open end of the tube, a leg depending at right-angles from an outer end of the rod, a similar leg depending at right-angles from the open end of the tube in parallel relation to the other leg, a separate clamp mounted to the bottom end of each leg, each clamp comprising an upper jaw and a lower jaw, the jaws of each leg extending toward the jaws of the other leg, the rod adapted to be manually moved selectively inwardly or outwardly relative to the tube to space the jaws of the related leg a selected distance relative to the jaws of the other leg; and key operable locking means mounted in part to the rod and in part to the tube for locking the rod in its moved position with the tube, wherein the lower jaw of one of the clamps is receivable in a brake cooling slot of a wheel of a motor vehicle, the lower jaw of the other clamp is receivable in a diametrically opposed brake cooling slot of the wheel, and the upper jaw of each clamp is engageable with the surface of the wheel above the related lower jaw upon movement of the rod inwardly of the tube.

6. A clamping device as in claim 5, wherein the rod and the tube are slidable outwardly relative to each other to withdraw the jaws of the clamps clear of the wheel.

7. A clamping device as in claim 5, wherein means is provided connecting each upper jaw to its related leg for adjustably spacing the upper jaw relative to the related lower jaw to obtain an engaging condition of the jaws with the wheel.

8. A clamping device as in claim 5, wherein the tube is sufficiently elongated so as to extend beyond the periphery of the wheel into abutment with a roadway upon which the wheel may be standing.

* * * * *